June 9, 1964     T. R. SMITH     3,136,926

RELAY ACTUATING CIRCUIT

Filed Jan. 31, 1961

INVENTOR.
Thomas R. Smith,
BY
William G. Landwier
AGENT

3,136,926
RELAY ACTUATING CIRCUIT
Thomas R. Smith, Newton, Iowa, assignor to The Maytag Company, Newton, Iowa, a corporation of Delaware
Filed Jan. 31, 1961, Ser. No. 86,107
2 Claims. (Cl. 317—130)

This invention relates to a circuit for actuating a relay, and, more particularly, to a condenser-resistance circuit which causes a relay to operate after the condenser becomes charged to a predetermined voltage.

This is a continuation-in-part of my copending application, Serial No. 22,323 filed April 14, 1960 now abandoned.

It is an object of the present invention to provide a circuit which contains sufficiently high resistance in series with a manually operated switch so as to insure safety to the operator, for example, in a circuit connected to the conventional 110 volt, 60 cycle line. It is another object of the invention to provide a circuit for operation of a relay after a time delay. It is a still further object of the invention to provide a circuit for actuation of a relay after a time delay. It is a still further object of the invention to provide a circuit for actuation of a relay which is independent of the relay circuit. Further objects and advantages of this invention will become evident as the description proceeds and from an examination of the accompanying drawing which illustrates one embodiment of the invention and in which similar numerals refer to similar parts throughout the several views.

Figure 1:
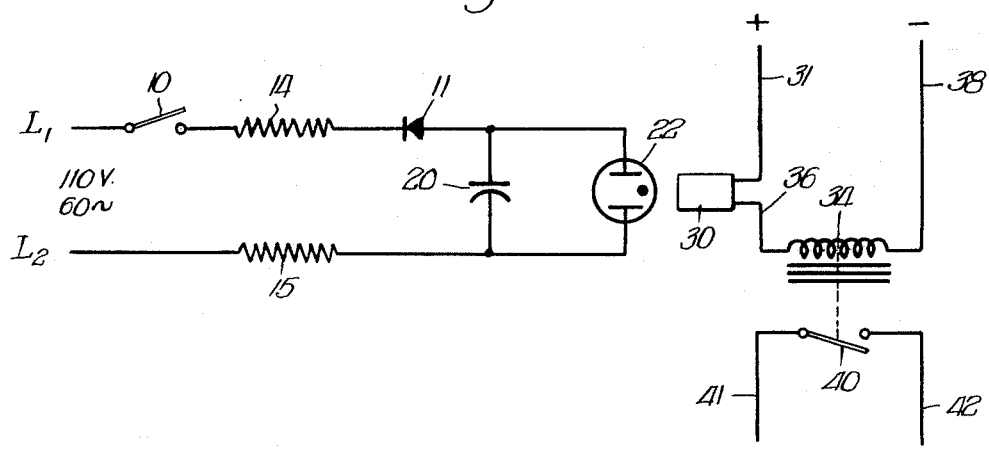
FIGURE 1 is a diagram of a circuit embodying the present invention.

Referring to FIGURE 1, a switch 10 controls the source of power supplied by line $L_1$, $L_2$, for example, 110 volts, 60 cycle alternating current. A selenium half-wave rectifier 11 is in series with the switch 10. Connected in series with the power source and rectifier 11 are capacitor 20 and series resistors 14 and 15. The capacitor is gradually charged by the D.C. circuit from the rectifier 11 through resistors 14 and 15 in accordance with well-known condenser-resistor principles. The resistors also provide a safety factor in reducing the voltage drop at other points in the circuit.

It is clear that a direct current power source may be employed rather than alternating current. If so, the rectifier 11 may be eliminated.

A gaseous discharge tube, such as a neon lamp 22 is in parallel to capacitor 20. Neon lamp 22 normally has a high resistance, however, when the charge on the capacitor 20 reaches a predetermined value, the gas is ionized and the circuit is conducted therethrough to produce visible discharge.

A light responsive resistor in the form of a light sensitive cell 30 is positioned to be illuminated by the neon lamp 22. One side of the light sensitive cell is connected by line 31 to a source of power, and the other side of the light sensitive cell is connected to relay 34 through line 36. The other side of the relay is connected to power line 38. Normally, when dark, the light sensitive cell 30 has a very high resistance. However, when illumined, the resistance of the cell 30 is greatly reduced and completes the circuit to energize relay 34.

Relay 34 operates switch contact 40. Switch contact 40 closes the circuit indicated by lines 41 and 42.

By way of example, if the power between lines $L_1$ and $L_2$ is 110 volts, 60 cycle alternating current, the capacitor 20 may be a six microfarad paper condenser, and the total resistance of resistors 14 and 15 may be 31 megohms, with resistor 14 of 30 megohms and resistor 15 of 1 megohm. The neon lamp 22 in this arrangement may be designed to fire at 68 to 76 volts.

Figure 2:
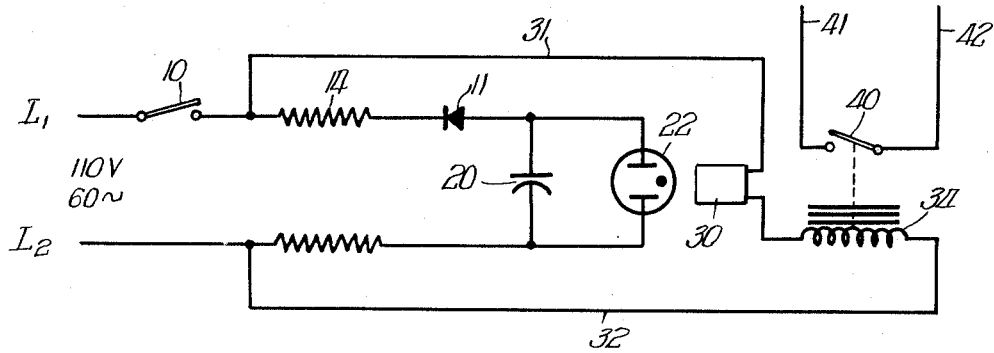
FIGURE 2 is a modification of the circuit shown in FIGURE 1 permitting the use of a single source of potential.

Referring now to FIGURE 2, the circuit is identical to the one shown in FIGURE 1 except that the power source for the relay circuit is the same as the power source employed for the condenser 20 and neon tube 22. It will be noted that lines 31, 32 which have in series therewith the light sensitive cell 30 and relay 34 are connected to power lines $L_1$ and $L_2$.

In the drawing and specification there has been set forth a preferred embodiment of the invention, and although specific terms are employed, these are used in a generic and descriptive sense only, and not for purposes of limitation. Changes in form and the proportion of parts, as well as the substitution of equivalents are contemplated, as circumstances may suggest or render expedient, without departing from the spirit or scope of this invention as further defined in the following claims.

I claim:

1. In a relay actuating circuitry, an electric relay to be actuated, a first power source for supplying alternating current, a first circuit having a rectifier for converting alternating to direct current, switch means for completing said first circuit to said first power source, said first circuit including capacitance and resistance connected in series for charging said capacitance through said resistance when said power source is connected by said switch means, a normally de-energized radiation generating element connected in parallel to said capacitance operable to generate radiation when said capacitance is charged to a predetermined voltage, a second power source, second circuit means connected to said second power source for energizing said electric relay, said second circuit electrically isolated from said first circuit, and a radiation responsive resistor having high resistance in the dark and low resistance when radiated by said radiation generating element, said radiation responsive resistor positioned for illumination by said radiation generating element, said electric relay and radiation responsive resistor connected in series in said second circuit means to said second power source.

2. A time delay circuit for actuating a relay comprising, a charging capacitance and a charging resistance connected in series in a normally de-energized first circuit, a first power source, switch means for connecting said charging capacitance and said charging resistance to said first power source to energize said first circuit and charge said capacitor over a time delay period, a normally de-energized radiation generating element connected in parallel to said capacitance operable to generate radiation after the charge on said capacitance has achieved a predetermined voltage, a second power source, an electric relay having a current coil for actuation by said second power source, second circuit means connected to said second power source for energizing said electric relay, said second circuit electrically isolated from said first circuit, and a radiation responsive resistor having high resistance in the dark and low resistance when radiated by said radiation generating element, said radiation responsive resistor positioned for illumination by said radiation generating element, said electric relay coil and radiation responsive resistor connected in series in said second circuit means to said second power source, whereby the closing of said switch means causes said capacitance to charge and the voltage thereacross to increase during a time delay until it equals the firing voltage of said radiation generating element whereupon said radiation responsive resistor is radiated to energize and operate said relay means.

References Cited in the file of this patent
UNITED STATES PATENTS

| | | |
|---|---|---|
| 2,057,472 | Bonds | Oct. 13, 1936 |
| 2,621,808 | Blakeney | Dec. 16, 1952 |
| 2,838,719 | Chitty | June 10, 1958 |
| 3,040,178 | Lyman et al. | June 19, 1962 |